United States Patent [19]
Ahrendt

[11] 3,829,121
[45] Aug. 13, 1974

[54] PIVOTED OVERHEAD GUARD

[75] Inventor: Donald A. Ahrendt, Chicago Heights, Ill.

[73] Assignee: Allis-Chalmers Corporation, Milwaukee, Mich.

[22] Filed: Mar. 23, 1973

[21] Appl. No.: 344,332

[52] U.S. Cl........ 280/150 C, 180/68.5, 214/DIG. 7, 280/5 A, 296/102
[51] Int. Cl............................................. B62d 21/00
[58] Field of Search........ 280/150 C, 5 A; 296/102, 296/28 C, 107; 214/DIG. 7, 700, 140; 180/68.5, 89 A

[56] References Cited
UNITED STATES PATENTS

| | | | |
|---|---|---|---|
| 2,764,449 | 9/1956 | Dunham | 280/5 A X |
| 3,289,871 | 12/1966 | Tourneau et al. | 214/DIG. 7 |
| 3,336,074 | 8/1967 | Barnes et al. | 280/150 C X |
| 3,463,542 | 8/1969 | Daniels | 180/68.5 X |
| 3,610,359 | 10/1971 | Becker | 180/68.5 |

*Primary Examiner*—David Schonberg
*Assistant Examiner*—David M. Mitchell
*Attorney, Agent, or Firm*—Charles L. Schwab

[57] ABSTRACT

An overhead guard for the operator of an electric, counterbalanced, narrow aisle, stand-up rider lift truck which includes a pair of support legs pivotally connected to a pair of upstanding hydraulic tanks integrally formed with the truck main frame between a battery compartment and a mast. The guard may be tilted forwardly about its transverse pivot axis to a position wherein the battery of the lift truck may be lifted from the battery compartment without interference with the guard. Cooperating abutments on the upstanding part of the frame and the guard legs determine the forwardmost tilted position of the guard, in which position the center of mass of the guard lies in a vertical line forward of the transverse pivot axis. Also in the forwardly tilted position of the guard, the top portions of the legs of the guard are in overlapping relation to the mast when the latter is in its vertical position. The pivot connection between the legs of the guard and the hydraulic tanks is adjacent the top front portion of the tanks and abutments on the legs rearward of the transverse axis cooperate with abutments at the top rear portion of the tanks to support the guard in its position of operator protection.

3 Claims, 2 Drawing Figures

PATENTED AUG 13 1974 3,829,121

PIVOTED OVERHEAD GUARD

BACKGROUND OF THE INVENTION

Numerous overhead guards for vehicle operators have heretofore been suggested including guards which pivot forwardly to facilitate removal of a battery from a lift truck. One such construction is shown in U.S. Pat. No. 3,610,359.

BRIEF SUMMARY OF THE INVENTION

A pair of downwardly extending legs of an overhead guard are pivotally connected on a transverse axis to the forward top part of a pair of upstanding hydraulic tanks comprising part of the frame of an electric, stand-up rider, narrow aisle, counterbalanced lift truck. The guard is tiltable about its axis to a forwardly disposed position so as not to interfere with an overhead lift mechanism for raising the battery of the truck. The legs of the overhead guard have a wider transverse spacing than the uprights of the mast whereby the guard may be pivoted forwardly to a point where the upper part of the legs are in overlapping relation to the upper end of mast uprights when the mast is in its normal vertical position. In this position of the guard its center of gravity is forward of the axis of its pivot connection with the top of the upstanding hydraulic tanks.

BRIEF DESCRIPTION OF THE DRAWINGS

The invention is illustrated in an electric, stand-up rider, narrow aisle, counterbalanced lift truck by the drawings, in which:

Both FIGS. 1 and 2 show parts of the truck broken away for illustration purposes.

DETAILED DESCRIPTION OF THE INVENTION

Figure 2:
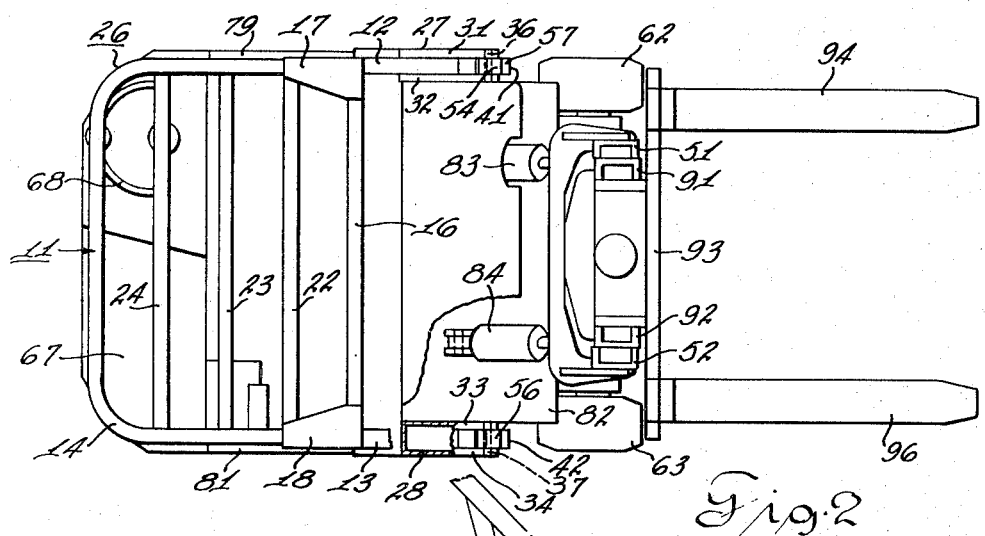
FIG. 2 is a top view of the truck shown in FIG. 1.
Figure 1:
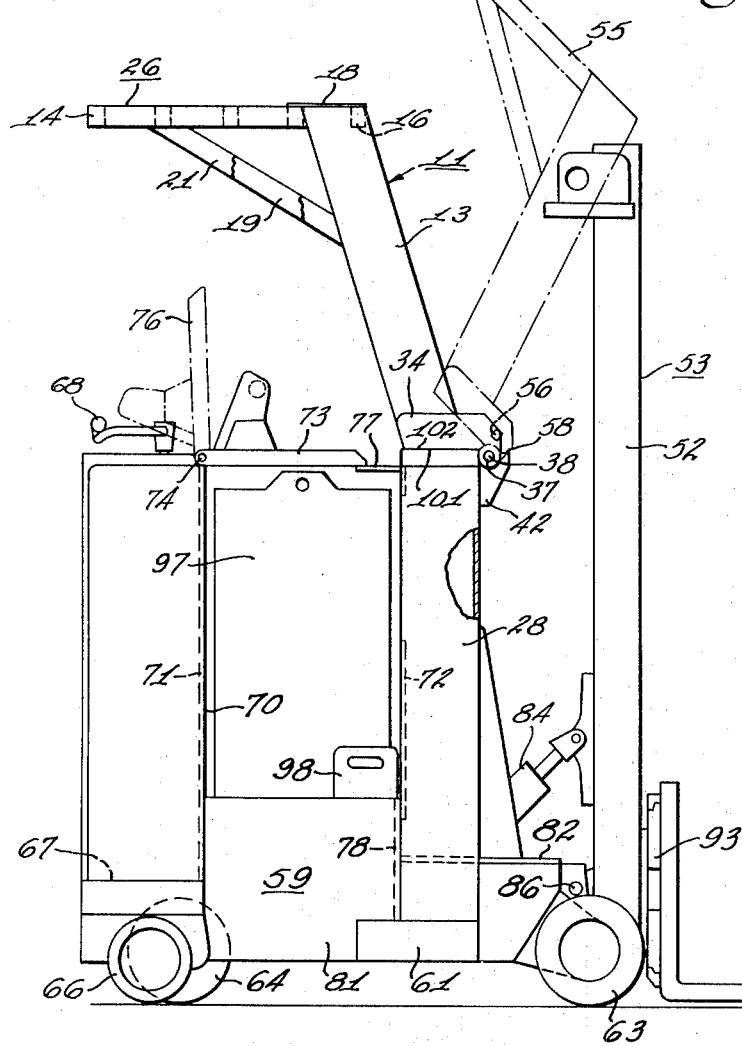
FIG. 1 is a side view of the lift truck.

Referring to the drawings, the overhead guard 11 includes a pair of transversely spaced legs 12, 13 which have their upper ends secured by welding to a U-shaped member 14, a transverse bar 16 and corner plates 17, 18. A pair of braces 19, 21 are welded at their upper and lower ends to the member 14 and legs 12, 13, respectively. Additionally, transverse bars 22, 23, 24 are welded at their ends to the longitudinal portions of the U-shaped member 14. The U-shaped member 14, bars 16, 22, 23, 24 and corner plates 17, 18 comprise a grill component 26 of the overhead guard 11. The legs 12, 13 extend downwardly and forwardly from the grill component 26 to lower ends disposed above a pair of upstanding hydraulic tanks 27, 28. Vertically and longitudinally disposed plates 31, 32 are welded to the leg 12 and similar plates 33, 34 are welded to the leg 13. The forward portions of the plates 31, 32, 33, 34 include bores for receiving pivot pins 36, 37 disposed on a common transverse axis 38. The pins 36, 37 extend through bores in pivot blocks 41, 42 welded to the top front of the upstanding hydraulic tanks 27, 28. The legs 12, 13 of the overhead guard are of sufficient transverse spacing that they are disposed laterally outwardly of the transversely outermost uprights 51, 52 of the mast 53. When the overhead guard is pivoted forwardly to the position shown in phantom by dot-dash lines 55, the top of the legs 12, 13 are in overlapping relation to the top of the mast 53 when it is in its illustrated vertical position. A pair of abutments 54, 56 welded to the plates 31, 32 and 33, 34, respectively, abut abutment surfaces 57, 58 of the pivot blocks 41, 42 to support the guard 11 in its forwardly tilted position wherein the center of gravity of the guard is forwardly of the pivot axis 38.

The overhead guard is shown installed on an electric, stand-up rider, counterbalanced, narrow aisle lift truck 59 which has a main frame 61 supported by a pair of nondriven and nonsteerable front wheels 62, 63, a powered and steerable rear drive wheel 64 and a castered rear wheel 66. An operator's station 67 is provided at the rear of the truck for a standing operator. A steering wheel 68 controls steering of the drive wheel 64 by suitable means, not shown. A battery compartment 70, defined by vertical walls 71, 72, is provided between the operator's station 67 and the hydraulic tanks 27, 28. A combined instrument panel and battery cover 73 is pivotally connected to the top of wall 71 on a transverse pivot axis permitting the cover to be pivoted rearwardly about transverse axis 74 to the open position shown in phantom by dot-dash lines 76. In its normal horizontal closed position the cover 73 rests at its forward end on a transverse angle 77 welded to the top parts of the transversely spaced hydraulic tanks 27, 28. The transverse wall 72 is welded to the tanks 27, 28. The tanks 27, 28 are an integral part of the truck frame 61 and are welded to a transverse plate 78, side plates 79, 81 and a horizontal plate 82 to which the mast tilt cylinders 83, 84 are pivotally connected. The primary nonextensible uprights 51, 52 of the mast 53 are pivotally connected to the main frame 61 on a transverse axis 86. Extensible secondary uprights 91, 92 are reciprocably mounted on the primary uprights 51, 52 and reciprocably support a lift carriage 93 having suitable lift forks 94, 96.

When it is desired to remove a battery 97 from the battery compartment 70 the overhead guard is pivoted forwardly to the position shown in dot-dash lines 55 and the battery compartment cover is pivoted upwardly and rearwardly to the open position shown by dot-dash lines 76. The battery retainer cleat 98 is removed and the battery 97 is lifted by an overhead lift about an inch and the lift then shifts the battery 97 transversely from the truck. When the overhead guard is in its normal position, in which the grill 26 is disposed in overhead protecting relation to an operator standing in the operator's station 67, abutting surfaces 101, 102 on the leg 13 and on the top of tank 28 coact together with pin 37 to support the leg 13 of the guard 11. Leg 12 is similarly supported.

From the foregoing it is apparent that a pair of ruggedly constructed and braced hydraulic tanks 27, 28 are provided having top portions serving as supports for an overhead guard in the manner illustrated. By placing the pivot axis 38 adjacent the top front of the tanks 27, 28, the abutting surfaces 101, 102 will engage at a sufficient distance rearwardly of the axis 38 to provide a reasonable moment arm for the forces on the pivot pin 37. By positioning the pivot axis 38 fairly high on the truck the rear of the guard will be disposed approximately over the hydraulic tanks when tilted forwardly, thus insuring that it will not interfere with the overhead hoist used to remove the battery. Also, the center of gravity of the tilted guard will be forward of the pivot axis whereby latch means need not be provided to maintain the guard in its forwardly tilted position.

The embodiments of an invention in which an exclusive property or privelege is claimed are defined as follows:

1. In combination with an electric powered, counterbalanced lift truck of the type having a frame, a tiltable vertical mast at the front end of said frame, an operator's station at the rear end of said frame and a battery compartment on the frame intermediate the mast and the operator's station:

a pair of transversely spaced upstanding hydraulic tanks disposed between said mast and said battery compartment and constituting an integral part of said frame with top portions disposed at the approximate height of said battery compartment, an overhead guard including
an overhead grill, and
a pair of downwardly extending and transversely spaced legs rigidly secured to said grill, pivot means pivotally connecting the lower front portions of said legs to upper front portions of said tanks, respectively, on a transverse pivot axis permitting said guard to be pivoted forwardly from a protective position in which said grill is above said operator's station to a forwardly tilted position in which its center of gravity is forward of said pivot axis, abutment surfaces on the lower rear portions of said legs and on the top of said tanks engageable to support said guard in said protective position, and abutment surfaces on said lower front portions of said legs and on said upper front portions of said tanks engageable to support said guard in said forwardly tilted position.

2. The structure of claim 1 wherein said legs are spaced transversely a distance greater than the transverse width of said mast whereby said upper end of said legs are in overlapping relation to the upper end of said mast when said guard is in its forwardly tilted position and said mast is in a vertical position.

3. The structure of claim 1 wherein the rear end of said guard is disposed at least as far forwardly as the front portion of said battery compartment when said guard is in said forwardly tilted position whereby a battery can be lifted from said battery compartment by an overhead hoist without interfering with said guard.

* * * * *